(12) United States Patent
Ozan et al.

(10) Patent No.: US 12,052,596 B2
(45) Date of Patent: Jul. 30, 2024

(54) REPORTING OF BEST WIDEBAND CQI IN MOBILE COMMUNICATIONS

(71) Applicant: MediaTek Singapore Pte. Ltd., Singapore (SG)

(72) Inventors: Waseem Hazim Ozan Ozan, Cambridge (GB); Mohammed S Aleabe Al-Imari, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 271 days.

(21) Appl. No.: 17/489,124

(22) Filed: Sep. 29, 2021

(65) Prior Publication Data

US 2022/0124536 A1 Apr. 21, 2022

Related U.S. Application Data

(60) Provisional application No. 63/093,817, filed on Oct. 20, 2020.

(51) Int. Cl.
*H04W 24/10* (2009.01)
*H04B 7/06* (2006.01)
*H04W 24/08* (2009.01)

(52) U.S. Cl.
CPC .......... *H04W 24/10* (2013.01); *H04B 7/0632* (2013.01); *H04W 24/08* (2013.01)

(58) Field of Classification Search
CPC ..... H04W 24/10; H04W 24/08; H04B 7/0632
See application file for complete search history.

(56) References Cited

U.S. PATENT DOCUMENTS

| 8,184,544 B2 | 5/2012 | Ko et al. |
| 10,904,901 B2 * | 1/2021 | Kim ..................... H04B 7/0632 |
| 2011/0268067 A1 | 11/2011 | Seo et al. |
| 2015/0078284 A1 | 3/2015 | Lee et al. |
| 2016/0211904 A1 * | 7/2016 | Kim ..................... H04W 24/08 |

(Continued)

FOREIGN PATENT DOCUMENTS

WO   WO 2020032748 A1   2/2020

OTHER PUBLICATIONS

AT&T et al.: "Remaining issues in CQI and MCS", 3GPP TSG RAN WG1 Meeting #92, R1-1802594, Mar. 2, 2018.

(Continued)

*Primary Examiner* — Yemane Mesfin
*Assistant Examiner* — Salma Ayad
(74) *Attorney, Agent, or Firm* — Han IP PLLC; Andy M. Han

(57) ABSTRACT

Various solutions pertaining to reporting of best wideband (WB) channel quality indicator (CQI) in mobile communications are described. An apparatus implemented in a user equipment (UE) calculates a value of a modified wideband channel quality indicator (WB-CQI) with respect to a wideband based on CQI values of a subset of subbands of a plurality of subbands in the wideband. The apparatus then reports the modified WB-CQI to a network. In calculating the value of the WB-CQI, the apparatus excludes one or more subbands from the plurality of subbands to result in the subset of subbands used in calculating the value of the WB-CQI. A respective CQI value of each of the excluded one or more subbands is lower than a respective CQI value of each of the subset of subbands.

18 Claims, 9 Drawing Sheets

(56) References Cited

U.S. PATENT DOCUMENTS

| | | | |
|---|---|---|---|
| 2017/0201308 A1* | 7/2017 | Park | H04W 16/14 |
| 2017/0257156 A1* | 9/2017 | Ko | H04L 1/0026 |
| 2018/0035425 A1* | 2/2018 | Yang | H04L 5/001 |
| 2018/0343046 A1* | 11/2018 | Park | H04W 76/27 |
| 2019/0261317 A1 | 8/2019 | Nammi et al. | |
| 2020/0235796 A1* | 7/2020 | Wu | H04B 7/0639 |
| 2023/0275636 A1* | 8/2023 | Singh | H04B 7/0626 |
| | | | 375/299 |

OTHER PUBLICATIONS

Huawei et al.: "CQI feedback overhead reduction in short TTI", 3GPP TSG RAN WG1 Meeting #85, R1-164867, May 27, 2016.
Taiwan Intellectual Property Office, Office Action for Taiwan Patent Application No. 110138633, May 26, 2022.

* cited by examiner

| Differential CQI Values | Offset |
|---|---|
| 0 | = 0 |
| 1 | ≥ 1 |
| 2 | ≤ -1 |
| 3 | Excluded |

FIG. 2

| Differential CQI Values | Offset |
|---|---|
| 0 | = 0 |
| 1 | ≥ 1 |
| 2 | -2, -1 |
| 3 | Excluded |

| Differential CQI Values | Offset |
|---|---|
| 0 | ≥ 0 |
| 1 | = -1 |
| 2 | ≤ -2 |
| 3 | Excluded |

FIG. 4

| Differential CQI Values | Offset |
|---|---|
| 0 | = 0 |
| 1 | = -1 |
| 2 | ≤ -2 |
| 3 | ≥ 1 |

FIG. 5

| Differential CQI Values | Offset |
|---|---|
| 0 | = 0 |
| 1 | = 1 |
| 2 | = 2 |
| 3 | = 3 |
| 4 | = -1 |
| 5 | = -2 |
| 6 | = -3 |
| 7 | Excluded |

FIG. 6

| Differential CQI Values | Offset |
|---|---|
| 0 | = 0 |
| 1 | = 1 |
| 2 | = 2 |
| 3 | = 3 |
| 4 | = -1 |
| 5 | = -2 |
| 6 | = -3 |
| 7 | = -4 |

FIG. 7

REPORTING OF BEST WIDEBAND CQI IN MOBILE COMMUNICATIONS

CROSS REFERENCE TO RELATED PATENT APPLICATION(S)

The present disclosure is part of a non-provisional application claiming the priority benefit of U.S. Patent Application No. 63/093,817, filed on 20 Oct. 2020, the content of which being incorporated by reference in its entirety.

TECHNICAL FIELD

The present disclosure is generally related to mobile communications and, more particularly, to reporting of best wideband (WB) channel quality indicator (CQI) in mobile communications.

BACKGROUND

Unless otherwise indicated herein, approaches described in this section are not prior art to the claims listed below and are not admitted as prior art by inclusion in this section.

In mobile communications, such as $5^{th}$ Generation (5G) New Radio (NR) based on the $3^{rd}$ Generation Partnership Project (3GPP) specifications, with respect to WB- and subband (SB)-CQI reporting, the radio resource control (RRC) information element (IE) CQI-FormatIndicator from the Report Frequency Configuration indicates whether a user equipment (UE) shall report a single CQI (e.g., for WB) or multiple CQIs (e.g., for SB), as specified in Technical Specification (TS) 38.214, clause 5.2.1.4. The RRC IE CSI-ReportingBand indicates a contiguous or non-contiguous subset of subbands in the bandwidth part (BWP) for which channel state information (CSI) shall be reported. The choice determines the number of subbands (e.g., subbands3 for three subbands, subbands4 for four subbands, and so on). This field is absent if there are less than 24 physical resource blocks (PRBs), or no subband), and is present if otherwise. The number of subbands can be from 3 (e.g., 24 PRBs, subband size of 8) and up. A BWP can include up to 19 subbands (e.g., 72/4=18, 144/8=18, plus one in case the BWP is not aligned with subband boundaries). Different BWP sizes have different subband sizes. That is, for BWP size of less than 24 PRBs, the subband size is 0; for BWP size of 24~72, the subband size is 4 or 8 PRBs; for BWP size of 73~144, the subband size is 8 or 16 PRBs; and for BWP size of 145~275, the subband size is 16 or 32 PRBs.

With respect to payload size in WB- and SB-CQI, the wideband would create a signaling payload size of 4×2=8 bits if a single CQI value is signaled with two codewords (when reporting a rank higher than 4). In such case, all the PRBs within the assigned subbands to the UE would be used to find the WB-CQI value. The 19 subbands would create a signaling payload size of 19×4×2=152 bits if the actual CQI of each subband is signaled with two codewords (when reporting a rank higher than 4). The 3GPP specifies the use of differential CQI (D-CQI) values for subband reporting. The D-CQI values require only 2 bits and hence the signaling payload size is reduced by a factor of 2 (e.g., 19×2×2=76 bits). Differential subband CQI values are defined relative to wideband CQI using the following expression: differential subbands CQI=subband CQI−wideband CQI. The mapping between a CQI offset and a reported D-CQI value includes: a D-CQI value of 0 mapping to an offset value of 0; a D-CQI value of 1 mapping to an offset value of 1; a D-CQI value of 2 mapping to an offset value of $\geq 2$; and a D-CQI value of 3 mapping to an offset value of $\leq -1$.

There are certain drawbacks associated with existing WB-CQI reporting. For instance, each WB-CQI value is a single value that covers a wide range of CQI offset values, thereby leading to unreliable modulation coding scheme (MCS) assignment to a resource block group (RBG). As an example, a UE may report a WB-CQI for ten subbands, which is equal to 9, and the CQI value for one of the ten subbands is equal to 4 but a base station (e.g., gNB) would only receive the WB-CQI value. The gNB would assign the MCS value to three RBGs out of which is a RBG with the lowest SB-CQI value and hence the gNB would assign an incorrect MCS value to that RBG, thereby impacting the reliability and/or spectral efficiency.

There are also certain drawbacks associated with D-CQI for SB-CQI reporting. For instance, the current differential CQI values cover a small range of CQI offset values, namely [0, 1, $\geq 2$, $\leq -1$]. As such, the very wide range of CQI offset values cannot be reported, and hence there is information loss of 11~19% for the reported CQI offset value(s), depending on the configuration.

In view of the above, it can be seen that there is a need for a solution for reporting of best WB-CQI in mobile communications to address aforementioned issues.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining reporting of best WB-CQI in mobile communications. It is believed that various schemes proposed herein may address or otherwise mitigate the issues described above.

Under various proposed schemes in accordance with the present disclosure, a method may involve calculating a value of a modified wideband channel quality indicator (WB-CQI) with respect to a wideband based on CQI values of a subset of subbands of a plurality of subbands in the wideband. The method may also involve reporting the modified WB-CQI to a network. In calculating the value of the WB-CQI, the method may involve excluding one or more subbands from the plurality of subbands to result in the subset of subbands used in calculating the value of the WB-CQI. A respective CQI value of each of the excluded one or more subbands may be lower than a respective CQI value of each of the subset of subbands.

It is noteworthy that, although description provided herein may be in the context of certain radio access technologies, networks and network topologies such as 5G/NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Industrial Internet-of-Things (IIoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a diagram of an example design under a proposed scheme in accordance with the present disclosure.

FIG. 3 is a diagram of an example design under a proposed scheme in accordance with the present disclosure.

FIG. 4 is a diagram of an example design under a proposed scheme in accordance with the present disclosure.

FIG. 5 is a diagram of an example design under a proposed scheme in accordance with the present disclosure.

FIG. 6 is a diagram of an example design under a proposed scheme in accordance with the present disclosure.

FIG. 7 is a diagram of an example design under a proposed scheme in accordance with the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reporting of best WB-CQI in mobile communications. According to the present disclosure, a number of possible solutions may be implemented separately or jointly. That is, although these possible solutions may be described below separately, two or more of these possible solutions may be implemented in one combination or another.

Figure 1:
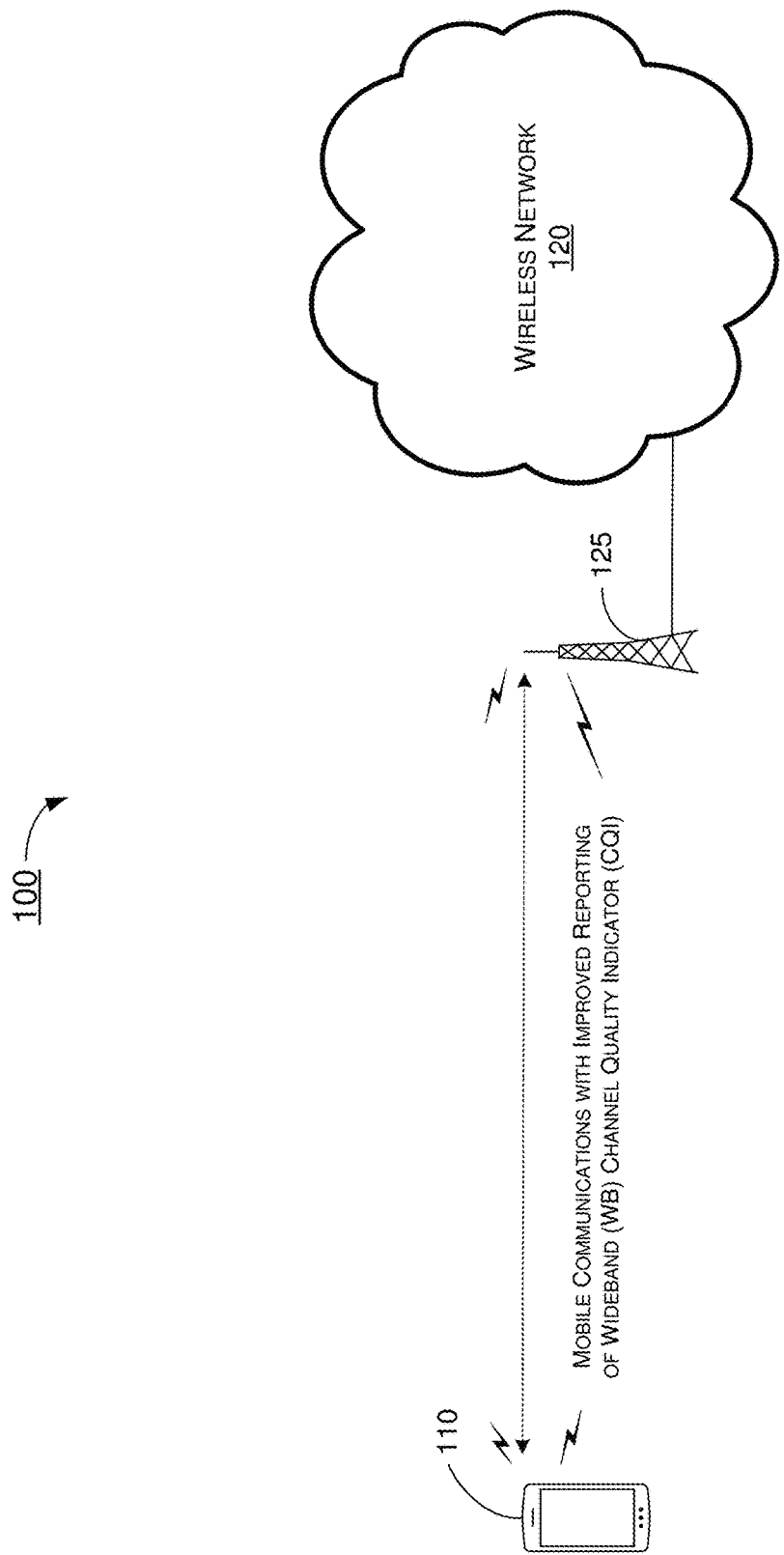
FIG. 1 is a diagram depicting an example scenario of out-of-order HARQ restriction in accordance with implementations of the present disclosure.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network or another type of network such as a LTE network, a LTE-Advance network, an IoT network, an IIoT network or a non-terrestrial network (NTN)). UE 110 may be in wireless communication with wireless network 120 via a base station or network node 125 (e.g., an eNB, gNB, transmit-receive point (TRP) or satellite). In network environment 100, UE 110 and wireless network 120 may implement various schemes pertaining to reporting of best WB-CQI in mobile communications, as described below.

Under a first proposed scheme in accordance with the present disclosure with respect to best-WB-CQI reporting, the definition of WB-CQI calculation may be changed or otherwise modified to take into account of the subband(s) with highest CQI values (herein interchangeably referred to as "best-subbands"), where a number of subband, or $Q$ subband(s), with lowest CQI values may be excluded from the WB-CQI calculation to result in a modified WB-CQI value (herein interchangeably referred to as "best-WB-CQI value"). Under the proposed scheme, calculation of the best-WB-CQI value may be expressed as:

Best-subbands=total subbands–$Q$ subbands with lowest CQI values.

Once the best-subbands are determined or otherwise identified, the best-WB-CQI may be calculated using all the PRBs in the best-subbands. For instance, the differential SB-CQI values may be defined relative to the best-WB-CQI based on the following expression:

Differential SB-CQI=SB-CQI–best-WB-CQI.

Under the proposed scheme, reporting of the best-WB-CQI may be configured or applied in one or more of different ways. For instance, reporting of the best-WB-CQI may be configured or applied based on the configured BWP size, the subband size, or the number of used subbands per BWP. Alternatively, reporting of the best-WB-CQI may be configured or applied per CQI table, per block error ratio (BLER) target, or per signal-to-noise ratio (SNR) range or value. Alternatively, reporting of the best-WB-CQI may be configured or applied per CQI report based on the RRC IE CQI-FormatIndicator for CQI reporting, per serving cell index, or per CSI resource. Alternatively, reporting of the best-WB-CQI may be configured or applied based on a report configuration type (e.g., per periodic, semi-periodic on physical uplink control channel (PUCCH) or physical uplink shared channel (PUSCH), or aperiodic) or per triggering mechanism. Alternatively, reporting of the best-WB-CQI may be configured or applied per rank indicator (RI), port index, precoding matrix indicator (PMI), and/or code type. Alternatively, reporting of the best-WB-CQI may be configured or applied based on open or closed-loop multiple-input-multiple-output (MIMO) transmission or report quantity. Alternatively, reporting of the best-WB-CQI may be configured or applied according to the numerology (e.g., bandwidth subcarrier spacing). Alternatively, reporting of the best-WB-CQI may be configured or applied based on the RRC IE CSI-ReportingBand, either contiguous or non-contiguous.

Moreover, reporting of the best-WB-CQI may be applied according to a triggering downlink control information (DCI) signaling such as, for example, an uplink (UL) or downlink (DL) DCI triggering an aperiodic CSI (A-CSI) report. The best-WB-CQI triggered according to a specific radio network temporary identifier (RNTI) (e.g., C-RNTI, MCS-C-RNTI or the like), search space, different DCI format or size (e.g., DCI formats 0_2 and 1_2) or the priority bit-field. Alternatively, reporting of the best-WB-CQI may be configured with multiple options (e.g., WB-CQI reporting and best-WB-CQI reporting) and network node 125 may signal dynamically to UE 110 to indicate which report is to be sent (e.g., by using a dedicated signal or DCI bit-field to select the reporting mechanism). Alternatively, for best-WB-CQI, UE 110 may be configured with differential CQI reporting (e.g., a 2-bit D-CQI table or 3-bit D-CQI table). Alternatively, network node 125 may signal dynamically to UE 110 to indicate which differential CQI table is to be used (e.g., by using a dedicated signal or DCI bit-field to select the reporting mechanism). Alternatively, UE 110 may be configured with multiple options for the Q value (e.g., 5 subbands and 3 subbands) and network node 125 may signal dynamically to UE 110 to indicate which option is to be used (e.g., by using a dedicated signal or DCI bit-field to select the Q value).

It is noteworthy that an existing differential CQI table as defined in the 3GPP specification allows a UE (e.g., UE 110) to report the SB-CQI values only. Under a second proposed scheme in accordance with the present disclosure, there may be several options to report the included and excluded SB-CQI values and/or their indices. A first option may involve using a differential CQI Table A (e.g., 2-bit D-CQI). A second option may involve using a differential CQI Table B (e.g., 2-bit D-CQI). A third option may involve using a differential CQI Table C (e.g., 2-bit D-CQI). A fourth option may involve using a differential CQI Table D (e.g., 2-bit D-CQI with a bitmap). A fifth option may involve using a differential CQI Table E (e.g., 3-bit D-CQI). A sixth option may involve using a differential CQI Table F (e.g., 3-bit D-CQI with a bitmap). Description of these different options is provided below with reference to FIG. 2~FIG. 7.

FIG. 2 illustrates an example design 200 under the first option of the proposed scheme. Referring to FIG. 2, design 200 shows an example of Table A of a 2-bit D-CQI. In design 200, the mapping for a differential CQI table may be changed or otherwise modified to take into account of reporting the indices of excluded SBs as shown in FIG. 2, where one entry of the D-CQI table is used to report the indices of neglected subbands. In this option, the differential SB-CQI values may be defined relative to the best-WB-CQI based on the following expression:

Differential SB-CQI=SB-CQI−best-WB-CQI.

Alternatively, the differential SB-CQI values may be defined relative to the WB-CQI based on the following expression:

Differential SB-CQI=SB-CQI−WB-CQI.

Alternatively, reporting of the mapping of D-CQI Table A may be configured or applied based on the configured BWP size, subband size, or the number of used subbands per BWP. Alternatively, reporting of the mapping of D-CQI Table A may be configured or applied per CQI table, per BLER target, or per SNR range or value. Alternatively, reporting of the mapping of D-CQI Table A may be configured or applied per CQI report based on RRC IE, or per serving cell index, or per CSI resource. Alternatively, reporting of the mapping of D-CQI Table A may be configured or applied based on a report configuration type (e.g., per periodic, semi-periodic on PUCCH or PUSCH, or aperiodic), or per triggering mechanism. Alternatively, reporting of the mapping of D-CQI Table A may be configured or applied per RI, port index, PMI, and/or code type. Alternatively, reporting of the mapping of D-CQI Table A may be configured or applied based on open or closed-loop MIMO transmission or report quantity. Alternatively, reporting of the mapping of D-CQI Table A may be configured or applied according to the numerology (e.g., bandwidth subcarrier spacing). Alternatively, reporting of the mapping of D-CQI Table A may be configured or applied based on the RRC IE CSI-ReportingBand, either contiguous or non-contiguous. Alternatively, reporting of the mapping of D-CQI Table A may be applied according to a triggering DCI (e.g., UL or DL DCI triggering the A-CSI report). The best-WB-CQI triggered according to a specific RNTI (e.g., C-RNTI or MCS-C-RNTI), search space, different DCI format/size (e.g., DCI formats 0_2 and 1_2) or the priority bit-field. Alternatively, UE 110 may be configured with multiple Q values (e.g., 5 subbands or 3 subbands).

FIG. 3 illustrates an example design 300 under the second option of the proposed scheme. Referring to FIG. 3, design 300 shows an example of Table B of a 2-bit D-CQI. In design 300, the mapping for a differential CQI table may be changed or otherwise modified to take into account of reporting the indices of excluded SBs as shown in FIG. 3, where one entry of the D-CQI table is used to report the indices of neglected subbands. In this option, the differential SB-CQI values may be defined relative to the best-WB-CQI based on the following expression:

Differential SB-CQI=SB-CQI−best-WB-CQI.

Alternatively, the differential SB-CQI values may be defined relative to the WB-CQI based on the following expression:

Differential SB-CQI=SB-CQI−WB-CQI.

Alternatively, reporting of the mapping of D-CQI Table B may be configured or applied based on the configured BWP size, subband size, or the number of used subbands per BWP. Alternatively, reporting of the mapping of D-CQI Table B may be configured or applied per CQI table, per BLER target, or per SNR range or value. Alternatively, reporting of the mapping of D-CQI Table B may be configured or applied per CQI report based on RRC IE, or per serving cell index, or per CSI resource. Alternatively, reporting of the mapping of D-CQI Table B may be configured or applied based on a report configuration type (e.g., per periodic, semi-periodic on PUCCH or PUSCH, or aperiodic), or per triggering mechanism. Alternatively, reporting of the mapping of D-CQI Table B may be configured or applied per RI, port index, PMI, and/or code type. Alternatively, reporting of the mapping of D-CQI Table B may be configured or applied based on open or closed-loop MIMO transmission or report quantity. Alternatively, reporting of the mapping of D-CQI Table B may be configured or applied according to the numerology (e.g., bandwidth subcarrier spacing). Alternatively, reporting of the mapping of D-CQI Table B may be configured or applied based on the RRC IE CSI-ReportingBand, either contiguous or non-contiguous. Alternatively, reporting of the mapping of D-CQI Table B may be applied according to a triggering DCI (e.g., UL or DL DCI triggering the A-CSI report). The best-WB-CQI triggered according to a specific RNTI (e.g., C-RNTI or MCS-C-RNTI), search space, different DCI format/size (e.g., DCI formats 0_2 and 1_2) or the priority bit-field. Alternatively, UE 110 may be configured with multiple Q values (e.g., 5 subbands or 3 subbands).

FIG. 4 illustrates an example design 400 under the third option of the proposed scheme. Referring to FIG. 4, design 400 shows an example of Table C of a 2-bit D-CQI. In design 400, the mapping for a differential CQI table may be changed or otherwise modified to take into account of reporting the indices of excluded SBs as shown in FIG. 4, where one entry of the D-CQI table is used to report the indices of neglected subbands. In this option, the differential SB-CQI values may be defined relative to the best-WB-CQI based on the following expression:

Differential SB-CQI=SB-CQI−best-WB-CQI.

Alternatively, the differential SB-CQI values may be defined relative to the WB-CQI based on the following expression:

Differential SB-CQI=SB-CQI−WB-CQI.

Alternatively, reporting of the mapping of D-CQI Table C may be configured or applied based on the configured BWP size, subband size, or the number of used subbands per BWP. Alternatively, reporting of the mapping of D-CQI Table C may be configured or applied per CQI table, per BLER target, or per SNR range or value. Alternatively, reporting of the mapping of D-CQI Table C may be configured or applied per CQI report based on RRC IE, or per serving cell index, or per CSI resource. Alternatively, reporting of the mapping of D-CQI Table C may be configured or applied based on a report configuration type (e.g., per periodic, semi-periodic on PUCCH or PUSCH, or aperiodic), or per triggering mechanism. Alternatively, reporting of the mapping of D-CQI Table C may be configured or applied per RI, port index, PMI, and/or code type. Alternatively, reporting of the mapping of D-CQI Table C may be configured or applied based on open or closed-loop MIMO transmission or report quantity. Alternatively, reporting of the mapping of D-CQI Table C may be configured or applied according to the numerology (e.g., bandwidth subcarrier spacing). Alternatively, reporting of the mapping of D-CQI Table C may be configured or applied based on the RRC IE CSI-ReportingBand, either contiguous or non-contiguous. Alternatively, reporting of the mapping of D-CQI Table C may be applied according to a triggering DCI (e.g., UL or DL DCI triggering the A-CSI report). The best-WB-CQI triggered according to a specific RNTI (e.g., C-RNTI or MCS-C-RNTI), search space, different DCI format/size (e.g., DCI formats 0_2 and 1_2) or the priority bit-field. Alternatively, UE 110 may be configured with multiple differential CQI tables (e.g., mapping of D-CQI Table A and mapping of D-CQI Table C) and network node 125 may signal dynamically to UE 110 to indicate which table is to be used (e.g., by using a dedicated signal or DCI bit-field to select the reporting mechanism). Alternatively, UE 110 may be configured with multiple Q values (e.g., 5 subbands or 3 subbands) and network node 125 may signal dynamically to UE 110 to indicate which option is to be used (e.g., by using a dedicated signal or DCI bit-field to select the Q value).

Figure 5:
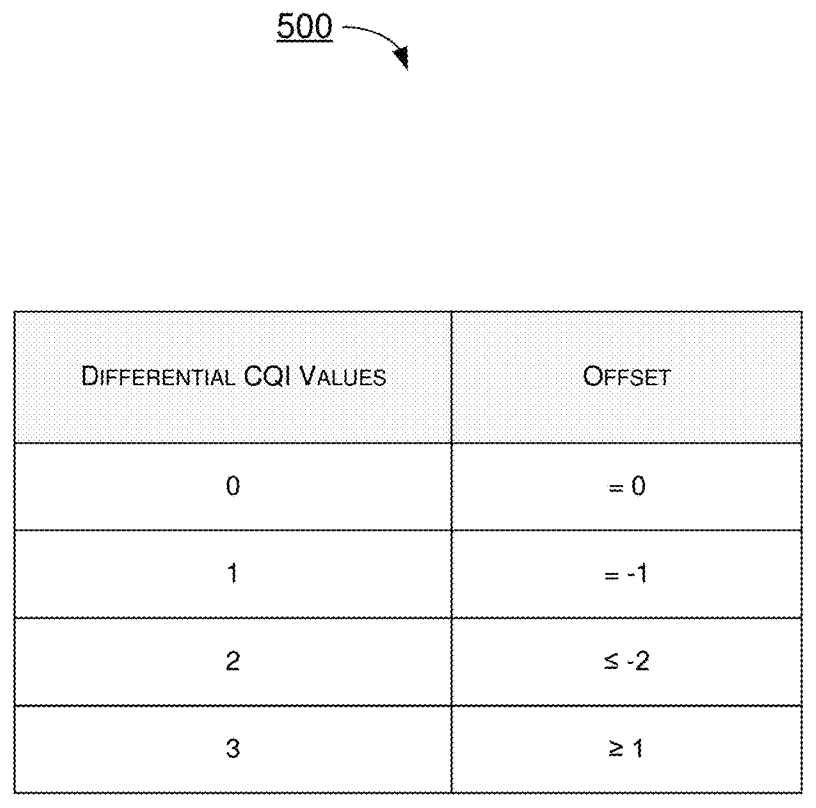

FIG. 5 illustrates an example design 500 under the fourth option of the proposed scheme. Referring to FIG. 5, design 500 shows an example of Table D of a 2-bit D-CQI. In design 500, the mapping for a differential CQI table may be changed or otherwise modified to capture the statistics in a negative region of D-CQI (e.g., the negative values of CQI offset) as shown in FIG. 5, with D-CQI reported for all included and excluded subbands. In this option, a bitmap may be reported for the indices of the excluded subbands. Moreover, the differential SB-CQI values may be defined relative to the best-WB-CQI based on the following expression:

Differential SB-CQI=SB-CQI−best-WB-CQI.

Alternatively, the differential SB-CQI values may be defined relative to the WB-CQI based on the following expression:

Differential SB-CQI=SB-CQI−WB-CQI.

Alternatively, reporting of the mapping of D-CQI Table D may be configured or applied based on the configured BWP size, subband size, or the number of used subbands per BWP. Alternatively, reporting of the mapping of D-CQI Table D may be configured or applied per CQI table, per BLER target, or per SNR range or value. Alternatively, reporting of the mapping of D-CQI Table D may be configured or applied per CQI report based on RRC IE, or per serving cell index, or per CSI resource. Alternatively, reporting of the mapping of D-CQI Table D may be configured or applied based on a report configuration type (e.g., per periodic, semi-periodic on PUCCH or PUSCH, or aperiodic), or per triggering mechanism. Alternatively, reporting of the mapping of D-CQI Table D may be configured or applied per RI, port index, PMI, and/or code type. Alternatively, reporting of the mapping of D-CQI Table D may be configured or applied based on open or closed-loop MIMO transmission or report quantity. Alternatively, reporting of the mapping of D-CQI Table D may be configured or applied according to the numerology (e.g., bandwidth subcarrier spacing). Alternatively, reporting of the mapping of D-CQI Table D may be configured or applied based on the RRC IE CSI-ReportingBand, either contiguous or non-contiguous. Alternatively, reporting of the mapping of D-CQI Table D may be applied according to a triggering DCI (e.g., UL or DL DCI triggering the A-CSI report). The best-WB-CQI triggered according to a specific RNTI (e.g., C-RNTI or MCS-C-RNTI), search space, different DCI format/size (e.g., DCI formats 0_2 and 1_2) or the priority bit-field. Alternatively, UE 110 may be configured with multiple differential CQI tables (e.g., mapping of D-CQI Table A and mapping of D-CQI Table D) and network node 125 may signal dynamically to UE 110 to indicate which table is to be used (e.g., by using a dedicated signal or DCI bit-field to select the reporting mechanism). Alternatively, UE 110 may be configured with multiple Q values (e.g., 5 subbands or 3 subbands) and network node 125 may signal dynamically to UE 110 to indicate which option is to be used (e.g., by using a dedicated signal or DCI bit-field to select the Q value).

FIG. 6 illustrates an example design 600 under the fifth option of the proposed scheme. Referring to FIG. 6, design 600 shows an example of Table E of a 3-bit D-CQI. In design 600, the mapping for a differential CQI table may be changed or otherwise modified to capture the statistics and to take into account of reporting the indices of excluded SBs as shown in FIG. 6, where one entry of the D-CQI table is used to report the indices of neglected subbands. In this option, the differential SB-CQI values may be defined relative to the best-WB-CQI based on the following expression:

Differential SB-CQI=SB-CQI−best-WB-CQI.

Alternatively, the differential SB-CQI values may be defined relative to the WB-CQI based on the following expression:

Differential SB-CQI=SB-CQI−WB-CQI.

Alternatively, reporting of the mapping of D-CQI Table E may be configured or applied based on the configured BWP size, subband size, or the number of used subbands per BWP. Alternatively, reporting of the mapping of D-CQI Table E may be configured or applied per CQI table, per BLER target, or per SNR range or value. Alternatively, reporting of the mapping of D-CQI Table E may be configured or applied per CQI report based on RRC IE, or per serving cell index, or per CSI resource. Alternatively, reporting of the mapping of D-CQI Table E may be configured or applied based on a report configuration type (e.g., per periodic, semi-periodic on PUCCH or PUSCH, or aperiodic), or per triggering mechanism. Alternatively, reporting of the mapping of D-CQI Table E may be configured or applied per RI, port index, PMI, and/or code type. Alternatively, reporting of the mapping of D-CQI Table E may be configured or applied based on open or closed-loop MIMO transmission or report quantity. Alternatively, reporting of the mapping of D-CQI Table E may be configured or applied according to the numerology (e.g., bandwidth subcarrier spacing). Alternatively, reporting of the mapping of D-CQI Table E may be configured or applied based on the RRC IE CSI-ReportingBand, either contiguous or non-contiguous. Alternatively, reporting of the mapping of D-CQI Table E may be applied according to a triggering DCI (e.g., UL or DL DCI triggering the A-CSI report). The best-WB-CQI triggered according to a specific RNTI (e.g., C-RNTI or MCS-C-RNTI), search space, different DCI format/size (e.g., DCI formats 0_2 and 1_2) or the priority bit-field. Alternatively, UE 110 may be configured with multiple differential CQI tables (e.g., mapping of D-CQI Table A and mapping of D-CQI Table E) and network node 125 may signal dynamically to UE 110 to indicate which table is to be used (e.g., by using a dedicated signal or DCI bit-field to select the reporting mechanism). Alternatively, UE 110 may be configured with multiple Q values (e.g., 5 subbands or 3 subbands) and network node 125 may signal dynamically to UE 110 to indicate which option is to be used (e.g., by using a dedicated signal or DCI bit-field to select the Q value).

FIG. 7 illustrates an example design 700 under the sixth option of the proposed scheme. Referring to FIG. 7, design 700 shows an example of Table F of a 3-bit D-CQI. In design 700, the mapping for a differential CQI table may be changed or otherwise modified to capture the statistics in a negative region of D-CQI (e.g., the negative values of CQI offset) as shown in FIG. 7, with D-CQI reported for all included and excluded subbands. In this option, a bitmap may be reported for the indices of the excluded subbands. Moreover, the differential SB-CQI values may be defined relative to the best-WB-CQI based on the following expression:

Differential SB-CQI=SB-CQI−best-WB-CQI.

Alternatively, the differential SB-CQI values may be defined relative to the WB-CQI based on the following expression:

Differential SB-CQI=SB-CQI−WB-CQI.

Alternatively, reporting of the mapping of D-CQI Table F may be configured or applied based on the configured BWP size, subband size, or the number of used subbands per BWP. Alternatively, reporting of the mapping of D-CQI Table F may be configured or applied per CQI table, per BLER target, or per SNR range or value. Alternatively, reporting of the mapping of D-CQI Table F may be configured or applied per CQI report based on RRC IE, or per serving cell index, or per CSI resource. Alternatively, reporting of the mapping of D-CQI Table F may be configured or applied based on a report configuration type (e.g., per periodic, semi-periodic on PUCCH or PUSCH, or aperiodic), or per triggering mechanism. Alternatively, reporting of the mapping of D-CQI Table F may be configured or applied per RI, port index, PMI, and/or code type. Alternatively, reporting of the mapping of D-CQI Table F may be configured or applied based on open or closed-loop MIMO transmission or report quantity. Alternatively, reporting of the mapping of D-CQI Table F may be configured or applied according to the numerology (e.g., bandwidth subcarrier spacing). Alternatively, reporting of the mapping of D-CQI Table F may be configured or applied based on the RRC IE CSI-ReportingBand, either contiguous or non-contiguous. Alternatively, reporting of the mapping of D-CQI Table F may be applied according to a triggering DCI (e.g., UL or DL DCI triggering the A-CSI report). The best-WB-CQI triggered according to a specific RNTI (e.g., C-RNTI or MCS-C-RNTI), search space, different DCI format/size (e.g., DCI formats 0_2 and 1_2) or the priority bit-field. Alternatively, UE 110 may be configured with multiple differential CQI tables (e.g., mapping of D-CQI Table A and mapping of D-CQI Table F) and network node 125 may signal dynamically to UE 110 to indicate which table is to be used (e.g., by using a dedicated signal or DCI bit-field to select the reporting mechanism). Alternatively, UE 110 may be configured with multiple Q values (e.g., 5 subbands or 3 subbands) and network node 125 may signal dynamically to UE 110 to indicate which option is to be used (e.g., by using a dedicated signal or DCI bit-field to select the Q value).

Under a third proposed scheme in accordance with the present disclosure, there may be several approaches to selecting the number of the excluded subbands (e.g., the value of Q). In a first approach, the value of Q may be selected according to a system configuration. That is, network node 125 may determine how many subbands to exclude and indicate such to UE 110. For instance, the value of Q may be configured by a high-layer parameter (e.g., an RRC parameter). Alternatively, the value of Q may be selected according to other system configurations (e.g., the configured BWP size). Alternatively, the value of Q may be applied or configured by DCL signaling.

In a second approach, the worst subbands may be excluded in a percentage manner. That is, a predefined X % of the allocated subbands may be excluded. For instance, 20% of the subbands may be excluded.

In a third approach, the value of Q may be selected based on a difference, gap or error between wideband and best-wideband (e.g., an improvement by a predefined Y CQI offset value). That is, the Q excluded subbands may be chosen such that the best-WB-CQI value is higher by a Y CQI value than the WB-CQI which is calculated based on all subbands. For instance, the CQI offset between the WB-CQI value and the best-WB-CQI value may need to be at least 2.

In a fourth approach, the value of Q may be selected based on a differential CQI distribution. That is, the Q excluded subbands may be chosen to ensure that the CQI offset in the D-CQI values is limited to be within a predefined range (e.g., a small range). In other words, the number of the excluded subbands may vary in different reports depending on channel condition. For instance, one or more subbands may be excluded in order to ensure the D-CQI offset distribution to be between [−1, 0, 1].

It is noteworthy that various features may be applied to all of the first approach, the second approach, the third approach, and the fourth approach, as described below. For instance, reporting of the Q value may be configured or applied based on the configured BWP size, subband size, or the number of used subbands per BWP. Alternatively, reporting of the Q value may be configured or applied per CQI table, per BLER target, or per SNR range or value. Alternatively, reporting of the Q value may be configured or applied per CQI report (e.g., RRC IE for CQI reporting), per serving cell index, or per CSI resource. Alternatively, reporting of the Q value may be configured or applied based on a report configuration type (e.g., per periodic, semi-periodic on PUCCH or PUSCH, or aperiodic), or per triggering mechanism. Alternatively, reporting of the Q value may be configured or applied per RI, port index, PMI, and/or code type. Alternatively, reporting of the Q value may be configured or applied based on open or closed-loop MIMO transmission or report quantity. Alternatively, reporting of the Q value may be configured or applied according to the numerology (e.g., bandwidth subcarrier spacing). Alternatively, reporting of the Q value may be configured or applied based on the RRC IE CSI-ReportingBand, either contiguous or non-contiguous. Alternatively, reporting of the Q value may be applied according to a triggering DCI (e.g., UL or DL DCI triggering the A-CSI report). The best-WB-CQI options triggered according to a specific RNTI (e.g., C-RNTI or MCS-C-RNTI), search space, different DCI format or size (e.g., DCI formats 0_2 and 1_2), or the priority bit-field. Alternatively, UE 110 may be configured with multiple Q values (e.g., 5 subbands and 3 subbands) and network node 125 may signal dynamically to UE 110 to indicate which option is to be used (e.g., by using a dedicated signal or DCI bit-field to select the Q value).

Illustrative Implementations

Figure 8:
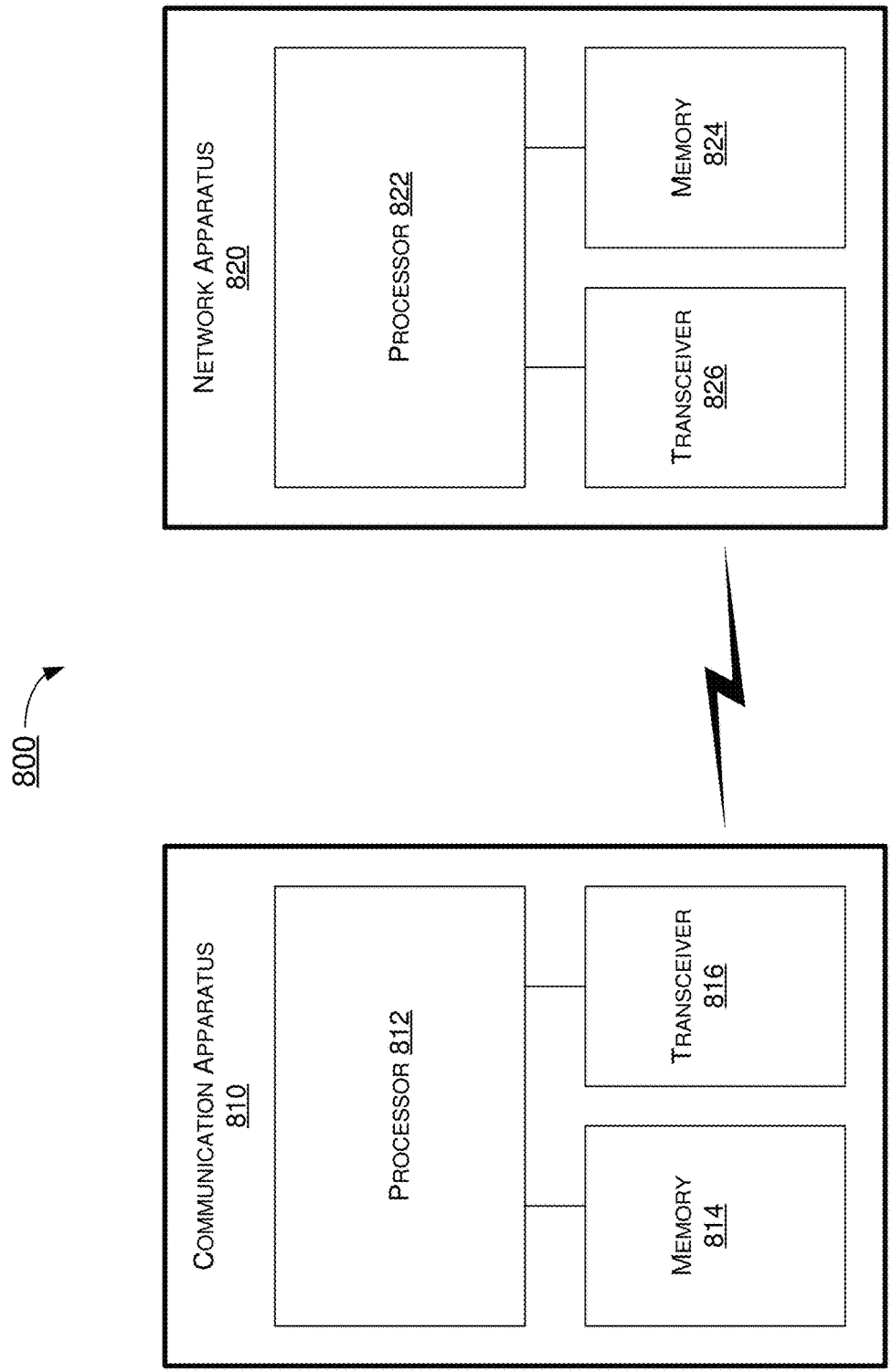
FIG. 8 is a block diagram of an example communication system in accordance with an implementation of the present disclosure.

FIG. 8 illustrates an example communication system 800 having an example communication apparatus 810 and an example network apparatus 820 in accordance with an implementation of the present disclosure. Each of communication apparatus 810 and network apparatus 820 may perform various functions to implement schemes, techniques, processes and methods described herein pertaining to reporting of best WB-CQI in mobile communications, including scenarios/schemes described above as well as the process(es) described below.

Communication apparatus 810 may be a part of an electronic apparatus, which may be a UE such as a portable or mobile apparatus, a wearable apparatus, a wireless communication apparatus or a computing apparatus. For instance, communication apparatus 810 may be implemented in a smartphone, a smartwatch, a personal digital assistant, a digital camera, or a computing equipment such as a tablet computer, a laptop computer or a notebook computer. Communication apparatus 810 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 810 may be implemented in a smart thermostat, a smart fridge, a smart door lock, a wireless speaker or a home control center. Alternatively, communication apparatus 810 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 810 may include at least some of those components shown in FIG. 8 such as a processor 812, for example. Communication apparatus 810 may further include one or more other components not pertinent to the proposed scheme of the present disclosure (e.g., internal power supply, display device and/or user interface device), and, thus, such component(s) of communication apparatus 810 are neither shown in FIG. 8 nor described below in the interest of simplicity and brevity.

Network apparatus 820 may be a part of an electronic apparatus, which may be a network node such as a base station, a small cell, a router or a gateway. For instance, network apparatus 820 may be implemented in an eNodeB in an LTE, LTE-Advanced or LTE-Advanced Pro network or in a gNB in a 5G, NR, IoT, NB-IoT or IIoT network. Alternatively, network apparatus 820 may be implemented in the form of one or more IC chips such as, for example and without limitation, one or more single-core processors, one or more multi-core processors, or one or more RISC or CISC processors. Network apparatus 820 may include at least some of those components shown in FIG. 8 such as a processor 822, for example. Network apparatus 820 may further include one or more other components not pertinent to the proposed scheme of the present disclosure (e.g., internal power supply, display device and/or user interface device), and, thus, such component(s) of network apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors, or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including reporting of best WB-CQI in mobile communications in accordance with various implementations of the present disclosure.

In some implementations, communication apparatus 810 may also include a transceiver 816 coupled to processor 812 and capable of wirelessly transmitting and receiving data. In some implementations, communication apparatus 810 may further include a memory 814 coupled to processor 812 and capable of being accessed by processor 812 and storing data therein. In some implementations, network apparatus 820 may also include a transceiver 826 coupled to processor 822 and capable of wirelessly transmitting and receiving data. In some implementations, network apparatus 820 may further include a memory 824 coupled to processor 822 and capable of being accessed by processor 822 and storing data therein. Accordingly, communication apparatus 810 and network apparatus 820 may wirelessly communicate with each other via transceiver 816 and transceiver 826, respectively.

To aid better understanding, the following description of the operations, functionalities and capabilities of each of communication apparatus 810 and network apparatus 820 is provided in the context of a mobile communication environment in which communication apparatus 810 is implemented in or as a UE (e.g., UE 110) and network apparatus 820 is implemented in or as a network node of a communication network (e.g., network node 125 of wireless network 120).

Under one or more proposed schemes in accordance with the present disclosure, processor 812 of apparatus 810, implemented in or as UE 110, may calculate a value of a modified WB-CQI with respect to a wideband based on CQI values of a subset of subbands of a plurality of subbands in the wideband. Additionally, processor 812 may transmit, via transceiver 816, the modified WB-CQI to a network (e.g., to network 120 via network apparatus 820 as network node 125).

In some implementations, in calculating the value of the WB-CQI, processor 812 may exclude one or more subbands from the plurality of subbands to result in the subset of subbands used in calculating the value of the WB-CQI. Moreover, a respective CQI value of each of the excluded one or more subbands may be lower than a respective CQI value of each of the subset of subbands.

In some implementations, the reporting of the modified WB-CQI may be configured or applied per CQI table, per BLER target, or per SNR range or value.

In some implementations, the reporting of the modified WB-CQI may be configured or applied per CQI report based on a RRC IE CSI-FormatIndicator for CQI reporting, per serving cell index, or per CSI resource.

In some implementations, the reporting of the modified WB-CQI may be configured or applied per triggering mechanism or based on a report configuration type which is per periodic, per aperiodic, or per semi-periodic on a PUCCH or PUSCH.

In some implementations, the reporting of the modified WB-CQI may be configured or applied based on a RRC IE CSI-ReportingBand, either contiguous or non-contiguous.

In some implementations, in reporting the modified WB-CQI, processor 812 may perform certain operations. For instance, processor 812 may dynamically receive an indication from the network (e.g., via apparatus 820). Additionally, processor 812 may report the modified WB-CQI to the network responsive to the indication selecting a modified WB-CQI reporting between a WB-CQI reporting and the modified WB-CQI reporting which the UE is configured to perform. In some implementations, the indication may include a dedicated signal or a DCI bit-field.

In some implementations, in calculating the value of the modified WB-CQI, processor 812 may perform certain operations. For instance, processor 812 may determine a value of a quantity Q of the one or more subbands to be excluded. Moreover, processor 812 may calculate the value of the modified WB-CQI by excluding the Q subbands from the plurality of subbands to result in the subset of subbands used in calculating the value of the WB-CQI.

In some implementations, the quantity Q of the one or more subbands may be either selected according to a system configuration or configured by a higher-layer parameter (e.g., RRC parameter) or DCI received from the network.

In some implementations, the quantity Q of the one or more subbands may be configured or applied based on a configured BWP size, a subband size, or a number of used subbands per BWP.

In some implementations, the quantity Q of the one or more subbands may be configured or applied per CQI report, per serving cell index, or per CSI resource.

In some implementations, in excluding the Q subbands, processor 812 may exclude a predefined percentage of the plurality of subbands.

In some implementations, in excluding the Q subbands, processor 812 may perform certain operations. For instance, processor 812 may determine the value of the Q such that the value of the modified WB-CQI is higher by a predefined CQI value than a value of a WB-CQI that is based on all subbands of the plurality of subbands. Moreover processor 812 may exclude the Q subbands from the plurality of subbands to result in the subset of subbands used in calculating the value of the WB-CQI.

In some implementations, in excluding the Q subbands, processor 812 may perform certain other operations. For instance, processor 812 may determine the value of the Q such that a D-CQI offset distribution is within a predefined range. Additionally, processor 812 may exclude the Q subbands from the plurality of subbands to result in the subset of subbands used in calculating the value of the WB-CQI.

In some implementations, in calculating the value of the modified WB-CQI, processor 812 may perform certain operations. For instance, processor 812 may dynamically receive an indication from the network indicating a quantity Q of the one or more subbands to be excluded. Moreover, processor 812 may calculate the value of the modified WB-CQI by excluding the Q subbands from the plurality of subbands to result in the subset of subbands used in calculating the value of the WB-CQI. In some implementations, the indication may include a dedicated signal or a DCI bit-field.

In some implementations, processor 812 may perform additional operations. For instance, processor 812 may calculate a value of a differential SB-CQI based on: (a) a difference between a value of a SB-CQI and the value of the modified WB-CQI, or (b) a difference between the value of the SB-CQI and a value of a WB-CQI. Moreover, processor 812 may report, via transceiver 816, the differential SB-CQI to the network (e.g., to network 120 via apparatus 820 as network node 125).

In some implementations, in reporting the differential SB-CQI, processor 812 may report the differential SB-CQI using a 2-bit D-CQI table. For instance, the 2-bit D-CQI table may include a Table A, a Table B, a Table C or a Table D. In such cases, the Table A may contain a mapping of D-CQI values [0, 1, 2, 3] to offset values [=0, ≥1, ≤−1, excluded], the Table B may contain a mapping of D-CQI values [0, 1, 2, 3] to offset values [=0, ≥1, =−2 or −1, excluded], the Table C may contain a mapping of D-CQI values [0, 1, 2, 3] to offset values [≥0, =−1, ≤−2, excluded], and the Table D may contain a mapping of D-CQI values [0, 1, 2, 3] to offset values [=0, =−1, ≤−2, ≥1].

In some implementations, in reporting the differential SB-CQI, processor 812 may report the differential SB-CQI using a 3-bit D-CQI table. For instance, the 3-bit D-CQI table may include a Table E or a Table F. In such cases, the Table E may contain a mapping of D-CQI values [0, 1, 2, 3, 4, 5, 6, 7] to offset values [=0, =1, =2, =3, =−1, =−2, =−3, excluded], and the Table F may contain a mapping of D-CQI values [0, 1, 2, 3, 4, 5, 6, 7] to offset values [=0, =1, =2, =3, =−1, =−2, =−3, =−4].

In some implementations, in reporting the differential SB-CQI, processor 812 may report the differential SB-CQI with a bitmap indicating indices of the excluded one or more subbands.

Illustrative Processes

Figure 9:
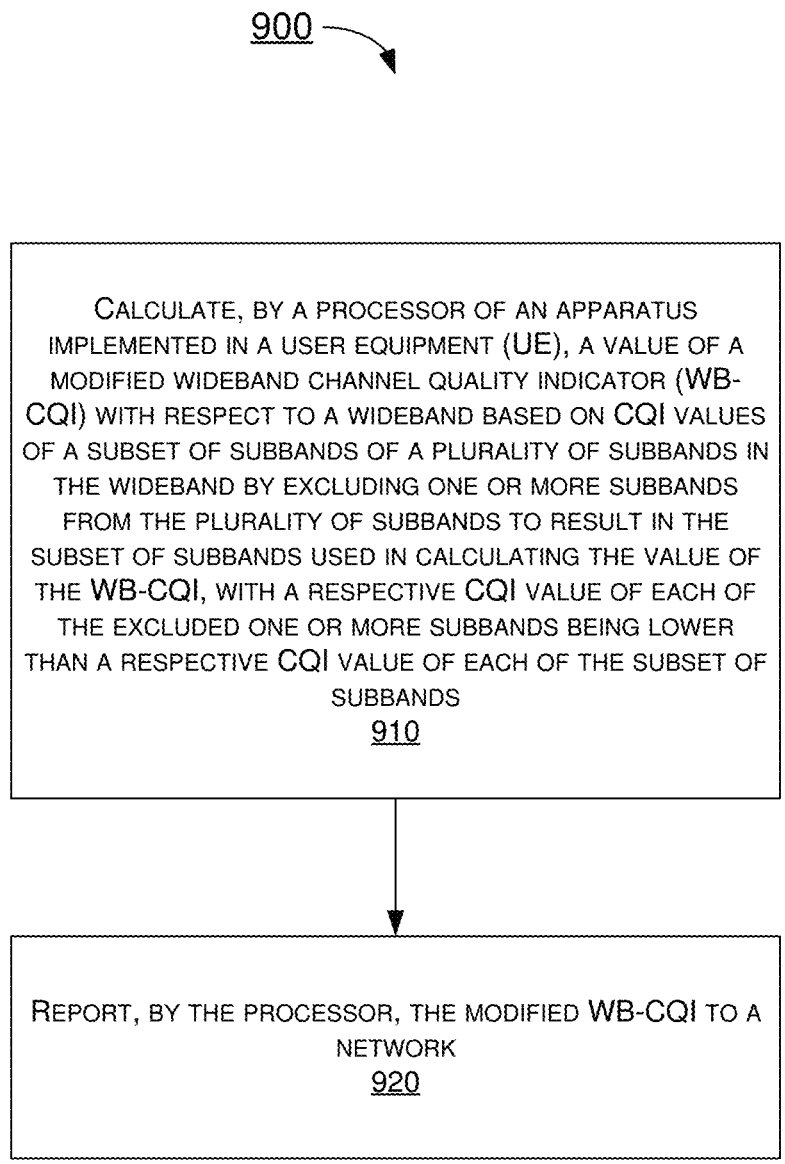
FIG. 9 is a flowchart of an example process in accordance with an implementation of the present disclosure.

FIG. 9 illustrates an example process 900 in accordance with an implementation of the present disclosure. Process 900 may be an example implementation of schemes described above whether partially or completely, with respect to reporting of best WB-CQI in mobile communications. Process 900 may represent an aspect of implementation of features of communication apparatus 810 and/or network apparatus 820. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order. Process 900 may be implemented by communication apparatus 810 or any suitable UE or machine type devices. Solely for illustrative purposes and without limitation, process 900 is described below in the context of communication apparatus 810 implemented in or as UE 110 in network environment 100 and network apparatus 820 implemented in or as network node 125 in network environment 100. Process 900 may begin at block 910.

At 910, process 900 may involve processor 812 of apparatus 810 calculating a value of a modified WB-CQI with respect to a wideband based on CQI values of a subset of subbands of a plurality of subbands in the wideband. Process 900 may proceed from 910 to 920.

At 920, process 900 may involve processor 812 transmitting, via transceiver 816, the modified WB-CQI to a network (e.g., to network 120 via network apparatus 820 as network node 125).

In some implementations, in calculating the value of the WB-CQI, process 900 may involve processor 812 excluding one or more subbands from the plurality of subbands to result in the subset of subbands used in calculating the value of the WB-CQI. Moreover, a respective CQI value of each of the excluded one or more subbands may be lower than a respective CQI value of each of the subset of subbands.

In some implementations, the reporting of the modified WB-CQI may be configured or applied per CQI table, per BLER target, or per SNR range or value.

In some implementations, the reporting of the modified WB-CQI may be configured or applied per CQI report based on a RRC IE CSI-FormatIndicator for CQI reporting, per serving cell index, or per CSI resource.

In some implementations, the reporting of the modified WB-CQI may be configured or applied per triggering mechanism or based on a report configuration type which is per periodic, per aperiodic, or per semi-periodic on a PUCCH or PUSCH.

In some implementations, the reporting of the modified WB-CQI may be configured or applied based on a RRC IE CSI-ReportingBand, either contiguous or non-contiguous.

In some implementations, in reporting the modified WB-CQI, process 900 may involve processor 812 performing certain operations. For instance, process 900 may involve processor 812 dynamically receiving an indication from the network (e.g., via apparatus 820). Additionally, process 900 may involve processor 812 reporting the modified WB-CQI to the network responsive to the indication selecting a modified WB-CQI reporting between a WB-CQI reporting and the modified WB-CQI reporting which the UE is configured to perform. In some implementations, the indication may include a dedicated signal or a DCI bit-field.

In some implementations, in calculating the value of the modified WB-CQI, process 900 may involve processor 812 performing certain operations. For instance, process 900 may involve processor 812 determining a value of a quantity Q of the one or more subbands to be excluded. Moreover, process 900 may involve processor 812 calculating the value of the modified WB-CQI by excluding the Q subbands from the plurality of subbands to result in the subset of subbands used in calculating the value of the WB-CQI.

In some implementations, the quantity Q of the one or more subbands may be either selected according to a system configuration or configured by a higher-layer parameter (e.g., RRC parameter) or DCI received from the network.

In some implementations, the quantity Q of the one or more subbands may be configured or applied based on a configured BWP size, a subband size, or a number of used subbands per BWP.

In some implementations, the quantity Q of the one or more subbands may be configured or applied per CQI report, per serving cell index, or per CSI resource.

In some implementations, in excluding the Q subbands, process 900 may involve processor 812 excluding a predefined percentage of the plurality of subbands.

In some implementations, in excluding the Q subbands, process 900 may involve processor 812 performing certain operations. For instance, process 900 may involve processor 812 determining the value of the Q such that the value of the modified WB-CQI is higher by a predefined CQI value than a value of a WB-CQI that is based on all subbands of the plurality of subbands. Moreover, process 900 may involve processor 812 excluding the Q subbands from the plurality of subbands to result in the subset of subbands used in calculating the value of the WB-CQI.

In some implementations, in excluding the Q subbands, process 900 may involve processor 812 performing certain other operations. For instance, process 900 may involve processor 812 determining the value of the Q such that a D-CQI offset distribution is within a predefined range. Additionally, process 900 may involve processor 812 excluding the Q subbands from the plurality of subbands to result in the subset of subbands used in calculating the value of the WB-CQI.

In some implementations, in calculating the value of the modified WB-CQI, process 900 may involve processor 812 performing certain operations. For instance, process 900 may involve processor 812 dynamically receiving an indication from the network indicating a quantity Q of the one or more subbands to be excluded. Moreover, process 900 may involve processor 812 calculating the value of the modified WB-CQI by excluding the Q subbands from the plurality of subbands to result in the subset of subbands used in calculating the value of the WB-CQI. In some implementations, the indication may include a dedicated signal or a DCI bit-field.

In some implementations, process 900 may involve processor 812 performing additional operations. For instance, process 900 may involve processor 812 calculating a value of a differential SB-CQI based on: (a) a difference between a value of a SB-CQI and the value of the modified WB-CQI, or (b) a difference between the value of the SB-CQI and a value of a WB-CQI. Moreover, process 900 may involve processor 812 reporting, via transceiver 816, the differential SB-CQI to the network (e.g., to network 120 via apparatus 820 as network node 125).

In some implementations, in reporting the differential SB-CQI, process 900 may involve processor 812 reporting the differential SB-CQI using a 2-bit D-CQI table. For instance, the 2-bit D-CQI table may include a Table A, a Table B, a Table C or a Table D. In such cases, the Table A may contain a mapping of D-CQI values [0, 1, 2, 3] to offset values [=0, ≥1, ≤−1, excluded], the Table B may contain a mapping of D-CQI values [0, 1, 2, 3] to offset values [=0, ≥1,=−2 or −1, excluded], the Table C may contain a mapping of D-CQI values [0, 1, 2, 3] to offset values [≥0, =−1, ≤−2, excluded], and the Table D may contain a mapping of D-CQI values [0, 1, 2, 3] to offset values [=0, =−1, ≤−2, ≥1].

In some implementations, in reporting the differential SB-CQI, process 900 may involve processor 812 reporting the differential SB-CQI using a 3-bit D-CQI table. For instance, the 3-bit D-CQI table may include a Table E or a Table F. In such cases, the Table E may contain a mapping of D-CQI values [0, 1, 2, 3, 4, 5, 6, 7] to offset values [=0, =1, =2, =3, =−1, =−2, =−3, excluded], and the Table F may contain a mapping of D-CQI values [0, 1, 2, 3, 4, 5, 6, 7] to offset values [=0, =1, =2, =3, =−1, =−2, =−3, =−4].

In some implementations, in reporting the differential SB-CQI, process 900 may involve processor 812 reporting the differential SB-CQI with a bitmap indicating indices of the excluded one or more subbands.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    calculating, by a processor of an apparatus implemented in a user equipment (UE), a value of a modified wideband channel quality indicator (WB-CQI) with respect to a wideband based on CQI values of a subset of subbands of a plurality of subbands in the wideband; and
    reporting, by the processor, the modified WB-CQI to a network,
    wherein the calculating of the value of the WB-CQI comprises excluding one or more subbands from the plurality of subbands to result in the subset of subbands used in calculating the value of the WB-CQI,
    wherein a respective CQI value of each of the excluded one or more subbands is lower than a respective CQI value of each of the subset of subbands,
    wherein the calculating of the value of the modified WB-CQI comprises:
        determining a value of a quantity (Q) of the one or more subbands to be excluded; and
        calculating the value of the modified WB-CQI by excluding the Q subbands from the plurality of subbands to result in the subset of subbands used in calculating the value of the WB-CQI, and
    wherein the excluding of the one or more subbands comprises:
        determining the value of the Q such that the value of the modified WB-CQI is higher by a predefined CQI value than a value of a WB-CQI that is based on all subbands of the plurality of subbands; and excluding the Q subbands from the plurality of subbands to result in the subset of subbands used in calculating the value of the WB-CQI.

2. The method of claim 1, wherein the reporting of the modified WB-CQI is configured or applied per CQI table, per block error ratio (BLER) target, or per signal-to-noise ratio (SNR) range or value.

3. The method of claim 1, wherein the reporting of the modified WB-CQI is configured or applied per CQI report based on a radio resource control (RRC) information element (IE) CSI-FormatIndicator for CQI reporting, per serving cell index, or per channel state information (CSI) resource.

4. The method of claim 1, wherein the reporting of the modified WB-CQI is configured or applied per triggering mechanism or based on a report configuration type which is per periodic, per aperiodic, or per semi-periodic on a physical uplink control channel (PUCCH) or physical uplink shared channel (PUSCH).

5. The method of claim 1, wherein the reporting of the modified WB-CQI is configured or applied based on a radio resource control (RRC) information element (IE) CSI-ReportingBand, either contiguous or non-contiguous.

6. The method of claim 1, wherein the reporting of the modified WB-CQI comprises:

dynamically receiving an indication from the network; and reporting the modified WB-CQI to the network responsive to the indication selecting a modified WB-CQI reporting between a WB-CQI reporting and the modified WB-CQI reporting which the UE is configured to perform, wherein the indication comprises a dedicated signal or a downlink control information (DCI) bit-field.

7. The method of claim 1, wherein the quantity Q of the one or more subbands is either selected according to a system configuration or configured by a radio resource control (RRC) parameter or downlink control information (DCI) received from the network.

8. The method of claim 1, wherein the quantity Q of the one or more subbands is configured or applied based on a configured bandwidth part (BWP) size, a subband size, or a number of used subbands per BWP.

9. The method of claim 1, wherein the quantity Q of the one or more subbands is configured or applied per CQI report, per serving cell index, or per channel state information (CSI) resource.

10. The method of claim 1, wherein the excluding of the Q subbands comprises excluding a predefined percentage of the plurality of subbands.

11. The method of claim 1, wherein the excluding of the Q subbands comprises:

determining the value of the Q such that a differential CQI (D-CQI) offset distribution is within a predefined range; and excluding the Q subbands from the plurality of subbands to result in the subset of subbands used in calculating the value of the WB-CQI.

12. The method of claim 1, wherein the calculating of the value of the modified WB-CQI comprises:

dynamically receiving an indication from the network indicating a quantity (Q) of the one or more subbands to be excluded; and calculating the value of the modified WB-CQI by excluding the Q subbands from the plurality of subbands to result in the subset of subbands used in calculating the value of the WB-CQI, wherein the indication comprises a dedicated signal or a downlink control information (DCI) bit-field.

13. The method of claim 1, further comprising:

calculating, by the processor, a value of a differential subband CQI (SB-CQI) based on:

a difference between a value of a SB-CQI and the value of the modified WB-CQI, or a difference between the value of the SB-CQI and a value of a WB-CQI; and reporting, by the processor, the differential SB-CQI to the network.

14. The method of claim 13, wherein the reporting of the differential SB-CQI comprises reporting the differential SB-CQI using a 2-bit differential CQI (D-CQI) table.

15. The method of claim 14, wherein the 2-bit D-CQI table comprises a Table A, a Table B, a Table C or a Table D, wherein:

the Table A comprises a mapping of D-CQI values [0, 1, 2, 3] to offset values [=0, ≥1, ≤−1, excluded], the Table B comprises a mapping of D-CQI values [0, 1, 2, 3] to offset values [=0, ≥1, =−2 or −1, excluded], the Table C comprises a mapping of D-CQI values [0, 1, 2, 3] to offset values [≥0, =−1,≤−2, excluded], and the Table D comprises a mapping of D-CQI values [0, 1, 2, 3] to offset values [=0, =−1, ≤−2, ≥].

16. The method of claim 13, wherein the reporting of the differential SB-CQI comprises reporting the differential SB-CQI using a 3-bit differential CQI (D-CQI) table.

17. The method of claim 16, wherein the 3-bit D-CQI table comprises a Table E or a Table F, wherein:

the Table E comprises a mapping of D-CQI values [0, 1, 2, 3, 4, 5, 6, 7] to offset values [=0, =1, =2, =3, =−1, =−2, =−3, excluded], and the Table F comprises a mapping of D-CQI values [0, 1, 2, 3, 4, 5, 6, 7] to offset values [=0, =1, =2, =3, =−1, =−2, =−3, =−4].

18. The method of claim 13, wherein the reporting of the differential SB-CQI comprises reporting the differential SB-CQI with a bitmap indicating indices of the excluded one or more subbands.

* * * * *